(12) United States Patent
Tong et al.

(10) Patent No.: US 10,432,773 B1
(45) Date of Patent: Oct. 1, 2019

(54) WIRELESS AUDIO TRANSCEIVERS

(71) Applicant: BESTECHNIC (SHANGHAI) CO., LTD., Shanghai (CN)

(72) Inventors: Weifeng Tong, Shanghai (CN); Liang Zhang, Shanghai (CN); Hua Li, Shanghai (CN); Fei Luo, Shanghai (CN); Qianli Ma, Shanghai (CN); Junhong Liu, Shanghai (CN); Lei Yang, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/206,767

(22) Filed: Nov. 30, 2018

(30) Foreign Application Priority Data

Jul. 20, 2018 (CN) .......................... 2018 1 0800387

(51) Int. Cl.
  *H04M 1/725* (2006.01)
  *H04W 4/80* (2018.01)
(52) U.S. Cl.
  CPC ........... *H04M 1/7253* (2013.01); *H04W 4/80* (2018.02)
(58) Field of Classification Search
  CPC .................................................. H04M 1/7253
  See application file for complete search history.

(56) References Cited

U.S. PATENT DOCUMENTS

| | | | | |
|---|---|---|---|---|
| 10,200,791 B1 * | 2/2019 | Liu | ........................ | H04R 5/033 |
| 10,200,803 B1 * | 2/2019 | Tong | ........................ | H04S 1/005 |
| 2008/0226094 A1 * | 9/2008 | Rutschman | ......... | H04M 1/6066 381/79 |
| 2012/0231732 A1 * | 9/2012 | Kerselaers | ........... | H04B 5/0006 455/41.1 |
| 2012/0302286 A1 * | 11/2012 | Beninghaus | ......... | H04B 1/3805 455/552.1 |
| 2018/0014106 A1 * | 1/2018 | Jensen | ................. | H04R 1/1041 |
| 2018/0331724 A1 * | 11/2018 | Li | ......................... | H04B 5/0006 |

* cited by examiner

*Primary Examiner* — David Bilodeau
(74) *Attorney, Agent, or Firm* — Bayes PLLC

(57) ABSTRACT

Embodiments of wireless audio systems, wireless transceivers, and methods for wirelessly communicating audio information are disclosed herein. In one example, a wireless audio system includes a primary wireless transceiver and a secondary wireless transceiver. The primary wireless transceiver includes a first radio frequency (RF) module configured to transmit, audio information at a first frequency. The primary wireless audio transceiver further includes a second RF module configured to transmit the audio information at a second frequency. The secondary wireless audio transceiver includes a third RF module configured to receive, the audio information at the first frequency. The secondary wireless transceiver further includes a fourth RF module configured to receive the audio information at the second frequency. At least one of the primary wireless audio transceiver or the secondary wireless audio transceiver includes a control module configured to determine a criterion corresponding to switching a transmission frequency from the first frequency to the second frequency is met. The control model is further configured to switch the transmission frequency.

21 Claims, 11 Drawing Sheets

WIRELESS AUDIO TRANSCEIVERS

CROSS-REFERENCE TO RELATED APPLICATIONS

This application claims the benefit of priority to Chinese Patent Application No. 201810800387.7 filed on Jul. 20, 2018, which is incorporated herein by reference in its entirety.

BACKGROUND

Embodiments of the present disclosure relate to wireless audio systems.

Loudspeakers, including headphones, have been widely used in daily life. Headphones are a pair of small loudspeaker drivers worn on or around the head over a user's ears, which convert an electrical signal to a corresponding sound.

Wired headphones, however, constrain the users' movement because of the wires (cords), and are particularly inconvenient during exercise. Conventional wireless headphones no longer need the wires between the headphones and the audio sources, but still require the wires between the left and right headphones.

SUMMARY

Embodiments of wireless audio systems, wireless transceivers, and methods for wirelessly communicating audio information are disclosed herein. In one example, a wireless audio system includes a primary wireless audio transceiver and a secondary wireless audio transceiver. The primary wireless audio transceiver includes a first radio frequency (RF) module configured to transmit, audio information at a first frequency. The primary wireless transceiver further includes a second RF module configured to transmit, the audio information at a second frequency. The secondary wireless audio transceiver includes a third RF module configured to receive, the audio information at the first frequency. The secondary wireless transceiver further includes a fourth RF module configured to receive, the audio information at the second frequency. At least one of the primary wireless transceiver and the secondary wireless transceiver includes a control module configured to determine, a criterion corresponding to switching the transmission frequency from the first frequency to the second frequency is met. The control model is further configured to switch the transmission frequency between the first frequency and the second frequency.

In another example, a method for wirelessly communicating audio information is disclosed. First audio information is received from an audio source. Second audio information is generated based on the first audio information and is transmitted from a wireless audio transceiver to another wireless audio transceiver at a first frequency. A parameter associated with transmitting the audio information at the first frequency is determined higher than a predetermined threshold and the audio information is transmitted by the wireless audio transceiver to the another wireless audio transceiver at a second frequency.

In a still another example, a method for wirelessly communicating audio information is disclosed. First audio information is received from an audio source. Second audio information is generated based on the first audio information and is transmitted from a wireless audio transceiver to another wireless audio transceiver. A parameter associated with transmitting the audio information at the first frequency is determined higher than a predetermined threshold. A control instruction corresponding to switching the transmission frequency is transmitted based on a short-range wireless communication protocol. The frequency based on which the second audio information is transmitted is switched from the first frequency to a second frequency.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
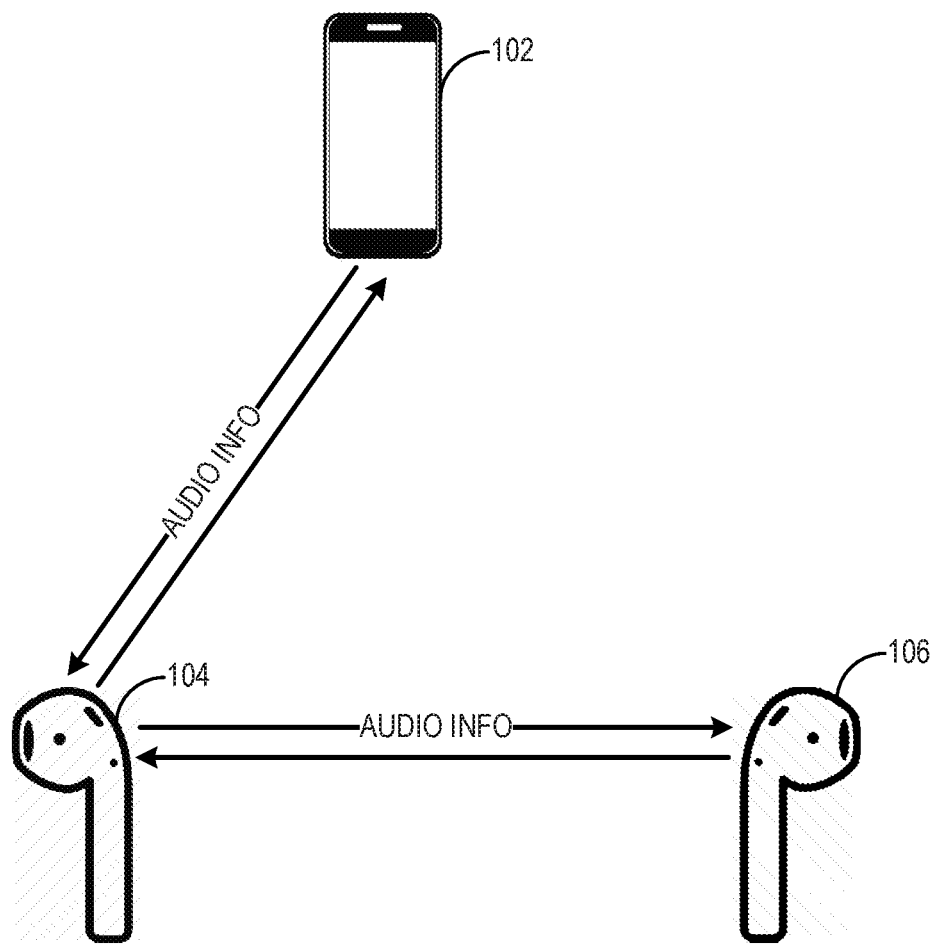
FIG. 1 is a block diagram illustrating an exemplary wireless audio system in accordance with an embodiment.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic.

Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

True wireless stereo (TWS) headphones (also known as untethered headphones) is a type of wireless headphones that remove the wires between the left and right headphones. In some TWS headphones, a primary headphone can simultaneously communicate with an audio source and a secondary headphone. The audio source can transmit the left-channel audio information and the right-channel audio information to the primary headphone. In response, the primary headphone may keep one of the two channels of audio information and transmit the other channel of audio information to the secondary headphone, such that both the left-channel and right-channel audio information can be simultaneously played by the respective headphone using a synchronization mechanism. High latency is one of the technical challenges for TWS headphones, which is mainly caused by data retransmission. For example, although the Bluetooth protocol has certain error correction functions, those functions may not work well when the signal quality in the air is poor. The poor signal quality requires repeated data retransmission until the correct data packets are received in order to avoid lagging.

For Bluetooth TWS headphones, the communication between the primary and secondary headphones is usually carried out by the carrier wave at 2.4 GHz, which is the RF band for both Bluetooth and WiFi signals. Also, the physical structures of the human head between the left and right ears can cause significant attenuation of the 2.4 GHz wireless signal, thereby affecting the signal quality between the primary and secondary headphones, such as causing lagging and/or high latency.

As will be disclosed in detail below, among other novel features, the wireless audio systems disclosed herein can achieve "true wireless stereo" with improved signal quality and reduced power consumption. In some embodiments of the present disclosure, the communication between the primary and secondary headphones is not carried out in the working band of Bluetooth (i.e., 2.4 GHz), but instead in a different band that is lower than the Bluetooth working band. For example, the primary and secondary headphones may communicate with one another using near-field magnetic induction (NFMI) communication (e.g., at about 10 MHz). NFMI signals can effectively pass through the physical structures of the human head, reduce signal interference, maintain high bit rate transmission, ensure audio play quality, and reduce power consumption.

In some embodiments of the present disclosure, the NFMI communication between the primary and secondary headphones is carried out based on a short-range wireless communication protocol that is amended from the short-range wireless communication protocol (e.g., the Bluetooth protocol) used by the communication between the primary headphone and the audio source. For example, each of the primary and secondary headphones may implement substantially the same Bluetooth protocol (except the differences related to the different carrier wave frequencies) and dynamically switch between high and low RF modules (e.g., operating at 2.4 GHz and 10 MHz carrier wave frequency, respectively) for short-range wireless communication. The headphones are thus compatible with the existing audio sources, such as smart phones and music players.

In some embodiments, a control instruction for the primary headphones and/or the secondary headphones to change working mode is carried out based on Bluetooth Low Energy protocols in the same working band as of Bluetooth (i.e., 2.4 GHz). Unlike classic Bluetooth, BLE remains in sleep mode constantly except for when a connection is initiated (e.g., when a control instruction is made). Using BLE to control the primary headphones and the secondary headphones can effectively reduce the power consumption for transmitting control instructions between the primary headphones and the secondary headphones.

In some embodiments, a switch of transmission frequency can be triggered based on determining the quality of the transmitted signal. For example, the quality could be determined based on Packet Loss Ratios (PLRs), Cyclic Redundancy Check sum (CRC), Header Error Check sum (HEC) and/or Frame Error Check sum (FEC) of the transmitted signal and/or any suitable parameters of the transmitted signal. In some embodiments, when a criterion is met (e.g., PLRs of the transmitted signal is too high which indicates a low signal transmission quality), the communication between the primary and secondary headphones is switched to a different working band then the ongoing one (e.g., when transmitting signal based on 2.4 GHz Bluetooth has a higher PLRs value than a predetermined threshold, the communication will be switched from basing on 2.4 GHz Bluetooth to basing on 10 MHz NFMI). In some embodiments, the quality of the then transmitted signal (e.g., after the transmission frequency switched) will be determined in a same or different manner as the determination of the previous transmitted signal. If the criterion is still not met, the signal's transmission frequency will be switched again (e.g., when signal transmitted based on 10 MHz NFMI also has a higher PLRs value than the predetermined threshold, the communication will be switched from basing on 10 MHz NFMI back to basing on 2.4 GHz Bluetooth). In some embodiments, the transmission frequency will keep switching until the criterion is met.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 is a block diagram illustrating an exemplary wireless audio system 100 in accordance with an embodiment. Wireless audio system 100 may include a primary headphone 104, and a secondary headphone 106. In some embodiments, wireless audio system 100 may also include an audio source 102. Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. Primary headphone 104 and secondary headphone 106 may be a pair of loudspeakers that can be worn on or around the head over a user's ears. Primary headphone 104 and secondary headphone 106 may be any electroacoustic transducers that convert an electrical signal (e.g., representing the audio information provided by audio source 102) to a corresponding sound. In some embodiments, each primary headphone 104 and secondary headphone 106 may be an earbud (also known as earpiece) that can plug into the user's ear canal. In some embodiments, primary headphone 104 and secondary headphone 106 may be TWS headphones, which are individual units that are not physically held by a band over the head and/or electrically connected by a cord. Primary headphone 104 and/or secondary headphone 106 may be combined with a microphone to form a headset according to some embodiments. It is understood that although in FIG. 1, wireless audio system 100 includes both audio source 102 and the pair of primary and secondary headphones 104 and 106, in some embodiments, wireless audio system 100 may include only primary headphone 104 and secondary headphone 106.

As shown in FIG. 1, bidirectional communications may be achieved between audio source 102 and primary headphone 104 and between primary headphone 104 and secondary headphone 106. Audio source 102 may transmit audio information (e.g., in data packets) by a carrier wave at a first frequency to primary headphone 104. In some embodiments, audio information may be a stream of audio stereo information in the form of compressed or uncompressed stereo samples for first and second audio channels, such as left-channel audio information and right-channel audio information or the like. Primary headphone 104 may transmit acknowledgement packets back to audio source 102 upon successful reception of the audio information from audio source 102.

In some embodiments, audio information may be transmitted from audio source 102 to primary headphone 104 according to the Bluetooth protocol at the working RF band between 2402 MHz and 2480 MHz or between 2400 MHz and 2483.5 MHz (referred to herein as "2.4 GHz"). Bluetooth is a wireless technology standard for exchanging data over short distances, and the Bluetooth protocol is one example of short-range wireless communication protocols. In some embodiments, audio information may be transmitted by audio source 102 to primary headphone 104 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocols. It is understood that the communication between audio source 102 and primary headphone 104 may be any other suitable short-range wireless communication in addition to Bluetooth and WiFi. In some embodiments, primary headphone 104 may be configured as a left-channel headphone or a right-channel headphone for playing the corresponding left-channel or right-channel audio information extracted from the audio information received from audio source 102.

Primary headphone 104 may transmit audio information (e.g., in data packets) to secondary headphone 106 by a carrier wave at the same frequency as it received from audio source 102. For example, primary headphone 104 may transmit audio information to secondary headphone 106 according to Bluetooth protocol at the working RF band 2.4 GHz. Primary headphone 104 may also transmit audio information to secondary headphone 106 at a second frequency that is lower than the first frequency. In some embodiments, the audio information transmitted from primary headphone 104 to secondary headphone 106 may be one of the left-channel or right-channel audio information depending on whether secondary headphone 106 is configured as a left-channel headphone or a right-channel headphone. Secondary headphone 106 may not communicate with audio source 102 directly, but instead, receive audio information forwarded by primary headphone 104. Secondary headphone 106 may transmit acknowledgement packets back to primary headphone 104 upon successful reception of the audio information from primary headphone 104.

In some embodiments, audio information may be transmitted by primary headphone 104 to secondary headphone 106 using NFMI communication. NFMI communication is a short-range wireless communication by coupling a tight, low-power, non-propagating magnetic field between devices. NFMI communication can contain transmission energy within the localized magnetic field, which does not radiate into free space. As the magnetic field can easily penetrate the physical structures of the human head, signal attenuation caused by the human head can be significantly reduced for the communication between primary headphone 104 and secondary headphone 106. In some embodiments, the second frequency (e.g., the carrier wave frequency for NFMI communication) is between about 5 MHz and about 50 MHz (e.g., between 5 MHz and 50 MHz), such as between 5 MHz and 40 MHz, between 5 MHz and 30 MHz, between 5 MHz and 20 MHz, between 5 MHz and 10 MHz, between 15 MHz and 50 MHz, between 25 MHz and 50 MHz, between 35 MHz and 50 MHz, and between 45 MHz and 50 MHz. In some embodiments, the carrier wave frequency is about 10 MHz (e.g., 10 MHz) or about 13.56 MHz (e.g., 13.56 MHz). As the second frequency may be significantly lower than the first frequency (e.g., 2.4 GHz for Bluetooth and WiFi), signal interference between two transmission modes (e.g., based on 2.4 GHz Bluetooth and based on 10 MHz NFMI respectively) can be greatly reduced as well for the communication between primary headphone 104 and secondary headphone 106.

Primary headphone 104 may communicate with secondary headphone 106 using a carrier wave with a frequency (e.g., 10 MHz) which is lower than the working RF band of Bluetooth or WiFi (e.g., 2.4 GHz), or using a 2.4 GHz Bluetooth as a carrier wave. Beside the differences related to the different carrier wave frequencies, the communication between primary headphone 104 and secondary headphone 106 may use a similar short-range wireless communication protocol that is substantially the same as the short-range wireless communication protocol used by the communication between audio source 102 and primary headphone 104, such as the Bluetooth protocol or WiFi protocol. That is, a short-range wireless communication protocol (e.g., the Bluetooth or WiFi protocol) may be amended to change the carrier wave frequency (and any specification related to the carrier wave frequency) to generate a substantially the same short-range wireless communication protocol (an amended short-range wireless communication protocol, e.g., an amended Bluetooth protocol or amended WiFi protocol)

used by the communication between primary headphone 104 and secondary headphone 106. In some embodiments, primary headphone 104 can implement a first short-range wireless communication protocol for the communication with audio source 102 and a second short-range wireless communication protocol amended from the first short-range wireless communication protocol for the communication with secondary headphone 106, thereby saving resource and reducing system complexity. Building on substantially the same short-range wireless communication protocol, primary headphone 104 can use different or similar carrier RF bands for the communication with audio source 102 and the communication with secondary headphone 106 to improve the signal quality of the communication with secondary headphone 106.

In some embodiments, primary headphone 104 and secondary headphone 106 may have the same hardware structures, but in different working modes. That is, the same headphone can work as either primary headphone 104 or secondary headphone 106 depending on its working mode (e.g., primary mode or secondary mode). In some embodiments, primary headphone 104 and secondary headphone 106 may switch their roles upon certain conditions as described below in detail. That is, primary headphone 104 may switch to the secondary mode to become a secondary headphone, while at the same time, secondary headphone 106 may switch to the primary mode to become a primary headphone.

Figure 2A:
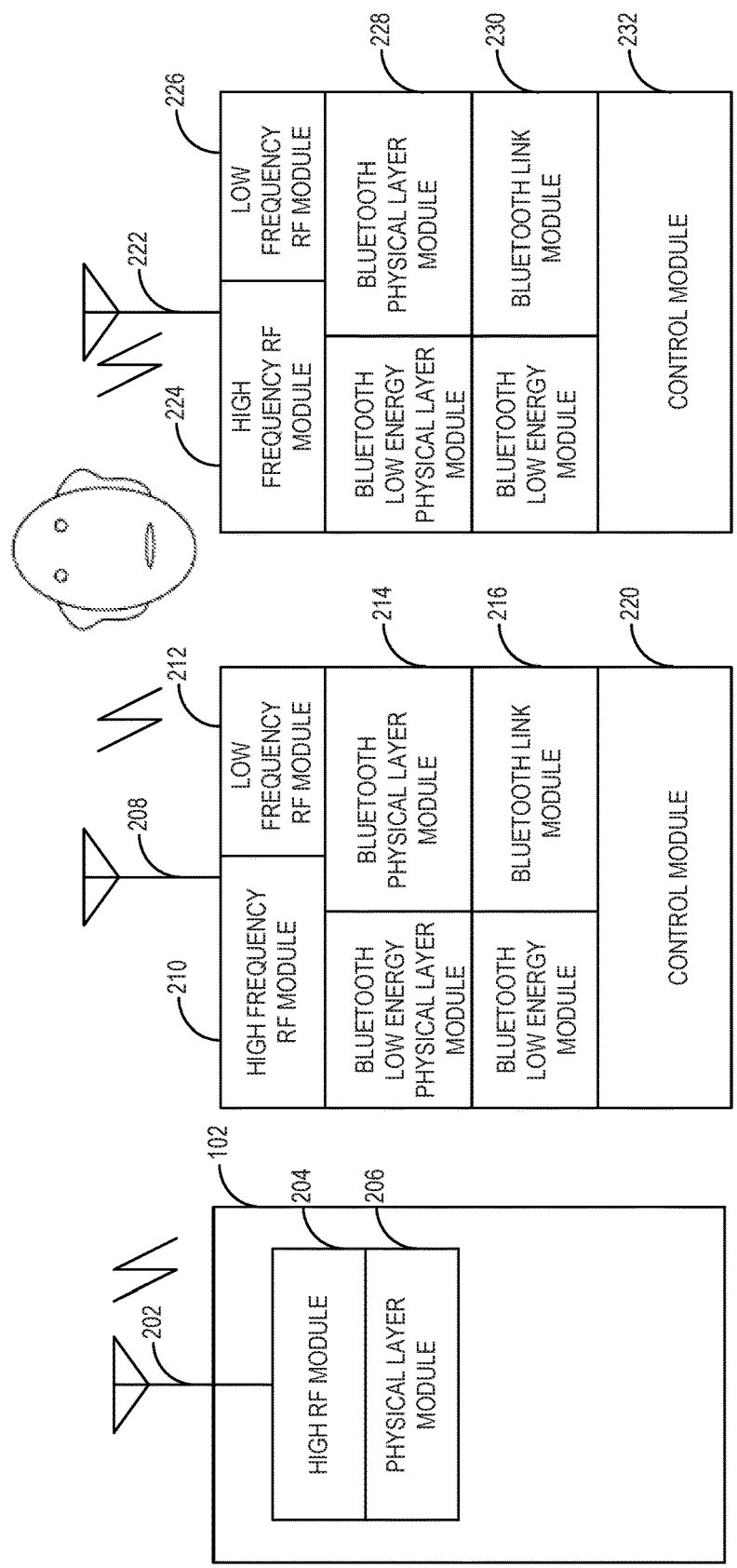
FIGS. 2A-2C are detailed block diagrams of different exemplary wireless audio systems in FIG. 1 in accordance with an embodiment.

FIG. 2A is a detailed block diagram of one exemplary wireless audio system 100 in FIG. 1 in accordance with an embodiment. Audio source 102 in this example includes an antenna 202, a high RF module 204, and a physical layer module 206. Antenna 202 may include an array of conductors for transmitting and receiving radio waves at one or more RF bands corresponding to high RF module 204. For example, antenna 202 may transmit audio information modulated by a carrier wave at a first frequency using high RF module 204. As described above, the audio information may be any music and/or voice information provided by audio source 102. For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels).

High RF module 204 and physical layer module 206 may be in the same integrated circuit (IC) chip that implements a short-range wireless communication protocol, such as the Bluetooth protocol or WiFi protocol. High RF module 204 may be configured to modulate the audio information using the carrier wave at the first frequency, for example, at 2.4 GHz for Bluetooth or WiFi communication, and transmit the audio information at the first frequency via antenna 202. Physical layer module 206 may be configured to generate the physical link (baseband) between audio source 102 and primary headphone 104 according to the short-range wireless communication protocol. For example, physical layer module 206 may generate baseband packets (e.g., Bluetooth packets) based on the music and/or voice data (payload) and perform error correction using any known methods, such as forward error correction (FEC) and automatic repeat request (ARQ). It is understood that additional module(s) may be included in audio source 102, either in the same IC chip in which high RF module 204 and physical layer module 206 are formed or in a separate IC chip, for transmitting the audio information at the first frequency based on the short-range wireless communication protocol.

Primary headphone 104 in this example may include a wireless transceiver (primary wireless transceiver) configured to receive the audio information transmitted by audio source 102 at the first frequency. Primary headphone 104 may include other components, such as an enclosure, speakers, and a microphone (not shown). Primary wireless transceiver may include an antenna 208, a high RF module 210, a low RF module 212, a physical layer module 214, a Bluetooth link and Bluetooth low energy link module 216 and a control module 220. In some embodiments, Bluetooth link and Bluetooth low energy link module 216 include a host controller interface (HCI) (not shown) configured to transport commands and events between the host and controller elements of the protocol stack based on Bluetooth link or Bluetooth low energy link and a media access control (MAC) layer module (not shown). Some or all of the modules mentioned above may be integrated in the same IC chip to reduce the chip size and/or power consumption. Primary headphone 104 may present at least part of the audio information received from audio source 102 to the user via one of the user's ear. For example, the speaker of primary headphone 104 may play music and/or voice based on the entire audio information or one audio channel of the audio information.

Antenna 208 may include an array of conductors for transmitting and receiving radio waves at two or more RF bands corresponding to high RF module 210 and low RF module 212. High RF module 210 may be configured to receive, from audio source 102, first audio information at the first frequency via antenna 208. High RF module 210 may also be configured to transmit, to secondary headphone 106 second audio information at the first frequency. Low RF module 212 may be configured to transmit, to secondary headphone 106, second audio information at a second frequency lower than the first frequency via antenna 208. As referred to herein, the first frequency used for the communication between audio source 102 and primary headphone 104, and between primary headphone 104 and secondary headphone 106 is a "high" RF, such as 2.4 GHz used for Bluetooth or WiFi communication; the second frequency used for communication between primary headphone 104 and secondary headphone 106 is a "low" RF, such as between 5 MHz and 50 MHz for NFMI communication. Both high RF module 210 and low RF module 212 may implement substantially the same short-range wireless communication protocol for short-range wireless communications at different RF bands. For example, high RF module 210 may implement a first short-range wireless communication protocol (e.g., the Bluetooth protocol or WiFi protocol), and low RF module 212 may implement a second short-range wireless communication protocol amended from the first short-range wireless communication protocol (e.g., the amended Bluetooth or amended WiFi protocol). The second short-range wireless communication protocol may be substantially the same as the first short-range wireless communication protocol except the carrier wave frequency (and any specification related to the carrier wave frequency).

In some embodiments, high RF module 210 may operate at about 2.4 GHz (e.g., 2.4 GHz). In some embodiments, low RF module 212 may operate between about 5 MHz (e.g., 5 MHz) and about 50 MHz (e.g., 50 MHz) for NFMI communication. For example, low RF module 212 may operate at about 10 MHz (e.g., 10 MHz). In some embodiments, low RF module 212 may implement the frequency-hopping spread spectrum (FHSS) technique, such that the second frequency (low RF) may include a plurality of frequencies based on FHSS. For example, low RF module 212 may implement the amended Bluetooth protocol and use the FHSS specification in the amended Bluetooth protocol. FHSS can further reduce signal interference.

The second audio information may be generated by high RF module 210 and/or low RF module 212 based on the first audio information. In some embodiments, the second audio information may be the same as the first audio information. For example, the first audio information provided by audio source 102 may be mono audio information, and the same mono audio information may be transmitted by primary headphone 104 to secondary headphone 106. In some embodiments, the second audio information may be part of the first audio information. For example, the first audio information provided by audio source 102 may include left-channel audio information and right-channel audio information representing two separate audio channels, and the second audio information may be one of the left-channel audio information and right-channel audio information extracted from the first audio information. That is, each of primary headphone 104 and secondary headphone 106 may play sound of a corresponding audio channel.

Physical layer module 214 may be configured to generate the physical links (baseband) between audio source 102 and primary headphone 104 and between primary headphone 104 and secondary headphone 106 according to the short-range wireless communication protocol and the amended short-range wireless communication protocol used by high RF module 210 and low RF module 212, respectively. In some embodiment, the communication protocol may be Bluetooth. For example, physical layer module 214 may generate baseband packets (e.g., Bluetooth packets) based on the music and/or voice data (payload) and perform error correction using any known methods, such as FEC and ARQ through a Bluetooth physical layer module. In another example, physical layer module 214 may generate control instructions based on a Bluetooth Low Energy (BLE) module. For example, a control instruction may be an 8-bits signal that includes a request for switching transmission frequency from the ongoing frequency (one of the first frequency or the second frequency) to the other one.

In some embodiments, physical layer module 214 may transmit signals at a symbol rate higher than 1 Msymbol/s. For example, physical layer module 214 may transmit signals at a symbol rate of 1.5 Msymbol/s. High transmission symbol rate may reduce the communication gap between primary headphone 104 and secondary headphone 106, and thus may reduce the power consumption of secondary headphone 106. Also, the reduction of the communications gap may further increase the reliability of the communication between primary headphone 104 and secondary headphone 106.

Bluetooth link and Bluetooth low energy link module 216 may be configured to generate the logical data channel links between audio source 102 and primary headphone 104 and between primary headphone 104 and secondary headphone 106 according to the short-range wireless communication protocol and the amended short-range wireless communication protocol used by high RF module 210 and low RF module 212, respectively. In some embodiments, Bluetooth link and Bluetooth low energy link module 216 include a host controller interface (HCI) (not shown) configured to transport commands and events between the host and controller elements of the protocol stack based on Bluetooth link or Bluetooth low energy link and a media access control (MAC) layer module (not shown). For example, Bluetooth link module 216 may generate link control channel, link manager channel, user asynchronous channel, user isochronous channel, and user synchronous channel based on the Bluetooth protocol (and the amended Bluetooth protocol) or Bluetooth Low Energy protocol. In some embodiments, Bluetooth link and Bluetooth low energy link module 216 may further control the modes of operation during the connection state. HCI (not shown) may be optionally included in primary headphone 104 and may be configured to provide a common interface to physical layer module 214 and Bluetooth link and Bluetooth low energy link module 216 and access to hardware status and control registers. For example, when implementing the Bluetooth protocol (and the amended Bluetooth protocol), HCI may provide a uniform method of accessing the Bluetooth baseband capabilities.

In this example, primary headphone 104 is referred to as "primary" because its RF module works in dual bands transmitter mode: both the high RF band and low RF band may be used for transmitting audio information to secondary headphone 106, and its high RF band is used for receiving audio information from audio source 102. That is, primary headphone 104 in FIG. 2 works in the primary mode in which high RF module 210 works in receiver mode for receiving audio information from audio source 102, and one or both of high RF module 210 and low RF module 212 may be enabled to work in the transmitter mode for transmitting audio information at the first frequency (high RF, e.g., 24 MHz) or the second frequency (low RF, e.g., 10 MHz) respectively.

In some embodiments, control module 220 may control primary headphone 104 to switch to the secondary mode to become a "secondary" headphone. For example, control module 220 may cease high RF module 210's communication with audio source 102 and cause high RF module 210 and low RF module 212 to switch to the receiver mode for receiving audio information from secondary headphone 106 only. In some embodiments, control module 220 may determine whether to switch the working mode of primary headphone 104 based on one or more parameters associated with primary headphone 104, such as power and/or signal quality. In one example, control module 220 may determine whether the remaining power of primary headphone 104 is below a threshold and cause primary headphone 104 to switch to the secondary mode because disabling high RF module 210's communication with audio source 102 can reduce power consumption. In another example, control module 220 may determine whether the signal quality (e.g., signal-to-noise ratio (SNR) or received signal strength indicator (RSSI)) is below a threshold and cause primary headphone 104 to switch to the secondary mode when the signal quality becomes unsatisfactory. It is understood that in some embodiments, the parameter(s) may be associated with both primary headphone 104 and secondary headphone 106. For example, control module 220 may use the relative power and/or signal quality of primary headphone 104 and secondary headphone 106 (e.g., the difference of remaining powers of primary and secondary headphones 104 and 106) to determine whether to switch primary headphone 104 into the secondary mode.

Secondary headphone 106 in this example may include a wireless transceiver (secondary wireless transceiver) configured to receive the audio information transmitted by primary headphone 104 at the first frequency (high RF, e.g., 24 GHz) and/or the second frequency (low RF, e.g., 10 MHz). Secondary headphone 106 may include other components, such as an enclosure, speakers, and a microphone (not shown). Secondary wireless transceiver may include an antenna 222, a high RF module 224, a low RF module 226, a physical layer module 228, Bluetooth link and Bluetooth low energy link module 230 and a control module 232. Some or all of the modules mentioned above may be integrated in the same IC chip to reduce the chip size and/or power consumption. Secondary headphone 106 may present at least part of the audio information to the user via one of the user's ear. For example, the speaker of secondary headphone 106 may play music and/or voice based on the audio information or one audio channel of the audio information.

In this example, secondary headphone 106 has the same hardware structures as primary headphone 104. The functions of each module mentioned above in secondary headphone 106 are the same as the counterparts in primary headphone 104 and thus, will not be repeated. Different from primary headphone 104, secondary headphone 106 in this example works in the secondary mode so that high RF module 224 and/or low RF module 226 are working in the receiver mode for receiving the audio information transmitted from high RF module 210 and/or low RF module 212 of primary headphone 104 at the first frequency (high RF, e.g., 2.4 GHz) or the second frequency (low RF, e.g., 10 MHz) respectively.

As described above, similar to control module 220 of primary headphone 104, control module 232 of secondary headphone 106 may switch secondary headphone 106 into the primary mode to become a "primary" headphone. The switch may be determined based on one or more parameters, such as power and/or signal quality. In some embodiments, both control modules 220 and 232 may work together to switch the roles of primary headphone 104 and secondary headphone 106 to improve the overall performance of the pair of wireless headphones 104 and 106. For example, power consumption may be balanced between the pair of wireless headphones 104 and 106, and the overall sound quality may be improved as well. In some embodiments, upon switching the roles of primary headphone 104 and secondary headphone 106, control module 220 of primary headphone 104 may transmit connection information (e.g., the host address of audio source 102) to secondary headphone 106, such that secondary headphone 106 can establish links with audio source 102. In some embodiments, while switching to the primary mode, high RF module 224 of secondary headphone 106 (now working as a primary headphone) may be enabled by control module 232 and forge itself as high RF module 210 of primary headphone 104 from audio source 102's perspective, so that audio source 102 will not perceive the working mode switch of primary headphone 104 and secondary headphone 106. As a result, the transmission of the audio information by audio source 102 may not be affected by the working mode switch of primary headphone 104 and secondary headphone 106.

In some embodiments, control module 220 and/or control module 232 may control primary headphone 104 to switch (or change) the audio information transmission frequency (carrier wave frequency) between primary headphone 104 and secondary headphone 106. In some embodiments, control model 220 and/or control module 232 may determine whether to switch the transmission frequency based on the quality of the transmitted audio information (e.g., the quality could be represented by one or more of parameters associated transmitted audio information such as PLRs, CRC, HEC and or FEC). In one example, audio information may be transmitted between primary headphone 104 and secondary headphone 106 based on the second frequency (low RF) while primary headphone 104 and secondary headphone 106 are worn on different ears of a user (e.g., left ear and right ear of the same user). When one of primary headphone 104 or secondary headphone 106 is taken off from the ear, control module 220 and/or control module 232 may determine if one or more of the parameters associated with the audio information transmitted is higher than a threshold. For example, after one or both of headphone 104 and headphone 106 is taken off, control model 220 and/or control module 232 may determine if the PLRs of audio information transmitted is higher than a predetermined threshold (e.g., 5%). If it is, control model 220 and/or control module 232 may switch the transmission frequency to the first frequency (high RF). In another example, control model 220 may switch the transmission frequency based on a prearranged agreement determined by primary headphone 104. For example, the prearranged agreement may include a prearranged time slot and a starting time point for the transmission frequency to switch from the first frequency to the second frequency and vis versa. In another example, audio information will be transmitted based on both the first frequency (e.g., a high frequency communication such as Bluetooth communication) and the second frequency (e.g., a low frequency communication NFMI communication) through physical layer module 214. In some embodiments, physical layer module 214 includes a Bluetooth low energy physical layer module and a Bluetooth physical layer module used for transmitting instructions between primary headphone 104 and secondary headphone 106. Control module 232 may determine whether an error-detecting code such as Cyclic Redundancy Check (CRC) of both transmitted information (audio information transmitted based on high RF and transmitted based on low RF) meet the requirement (e.g., reminder of the check is 0) and may choose one frequency for Bluetooth link and Bluetooth low energy link module 216 to transmit audio information. For example, if the check is succeeded (e.g., the reminder of CRC is 0) the transmitted audio information meets the requirement. Otherwise, the transmitted audio information fails to meet the requirement. In some embodiments, if both of the transmitted audio information meet the requirement (e.g., reminder of the check is 0) or if both of the transmitted audio information fail to meet the requirement (e.g., reminder of the check is not 0), control module may choose either the first frequency or the second frequency for MAC layer to transmit the audio information. However, if only one meets the requirement and the other does not, control module 220 and/or control module 232 may choose the one that meets the requirement for MAC layer to transmit the audio information. As only one of the transmitted information (audio information transmitted based on high RF and transmitted based on low RF) needs to meet the requirement, the reliability of the transmission is increased.

Figure 2B:
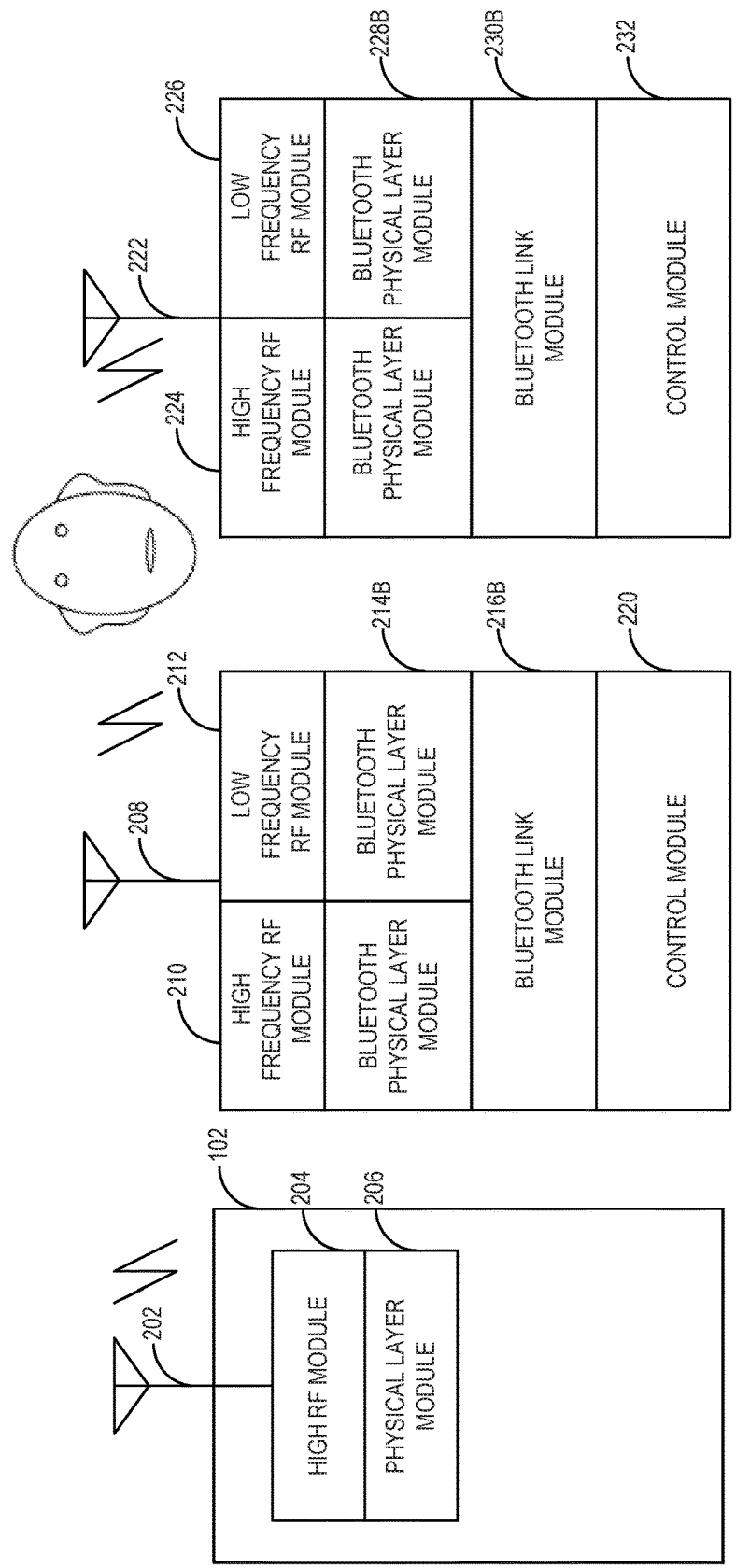

In some embodiments, as shown in FIG. 2B, Bluetooth physical layer module 214B may include two Bluetooth physical layer modules. Bluetooth link module 216B may include one Bluetooth link module having a host controller interface (HCI) (not shown) configured to transport commands and events between the host and controller elements of the protocol stack and a media access control (MAC) layer module (not shown) based on Bluetooth link. Thus, audio information may be transmitted independently based on high RF and low RF and the control instructions may only be transmitted based on Bluetooth protocol. Except for Bluetooth physical layer module 214B, Bluetooth link module 216B, and the corresponding parts in secondary headphone 106 (e.g., Bluetooth link module 228B and Bluetooth link module 230B), the rest of the structure are substantially the same with the structures in FIG. 2A.

Figure 2C:
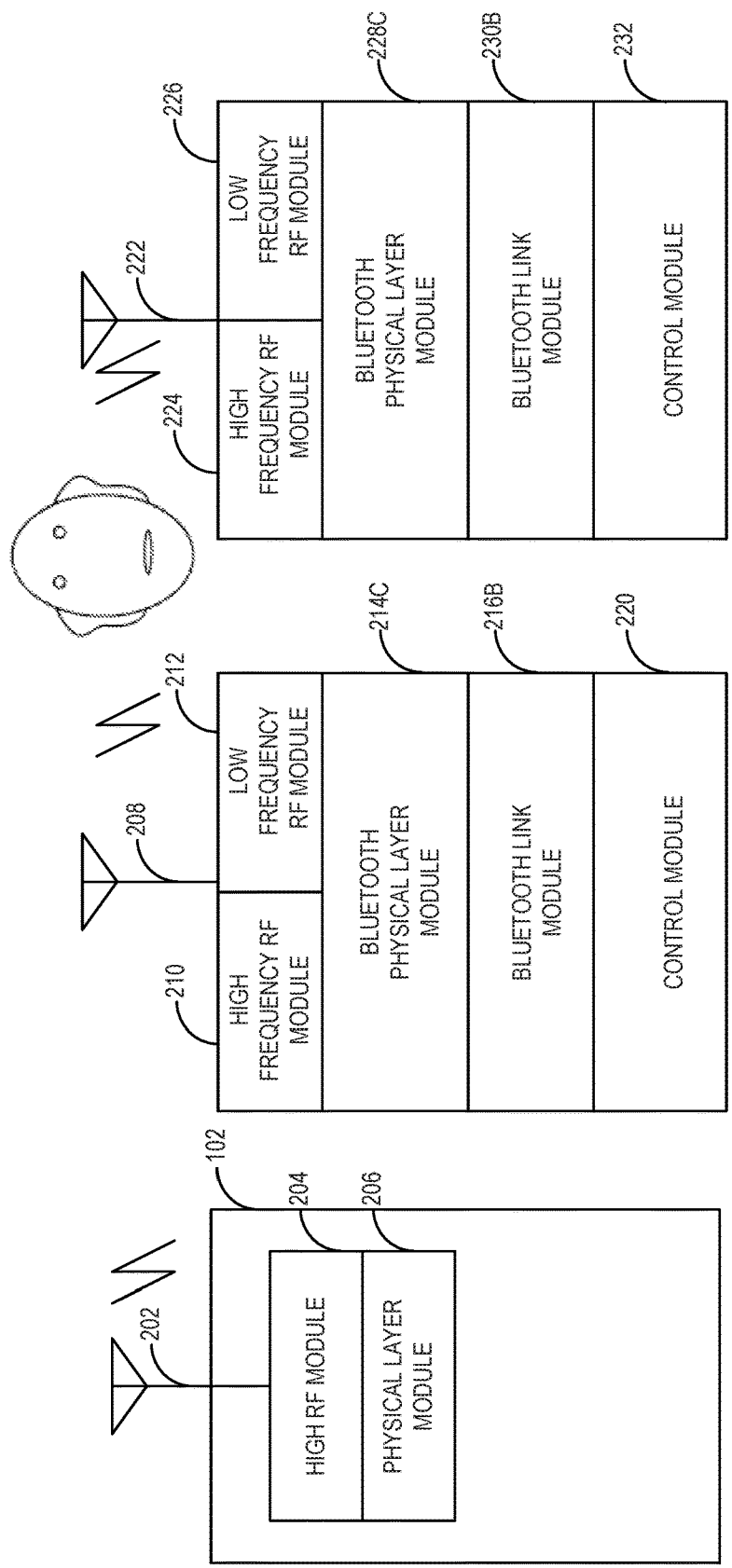

In some other embodiments, as shown in FIG. 2C, Bluetooth physical layer module 214C may only include one Bluetooth physical layer module. Except for Bluetooth physical layer module 214C and the corresponding parts in secondary headphone 106 (e.g., Bluetooth physical module 228C), the rest of the structure are substantially the same with the structures in FIG. 2A.

Figure 3:
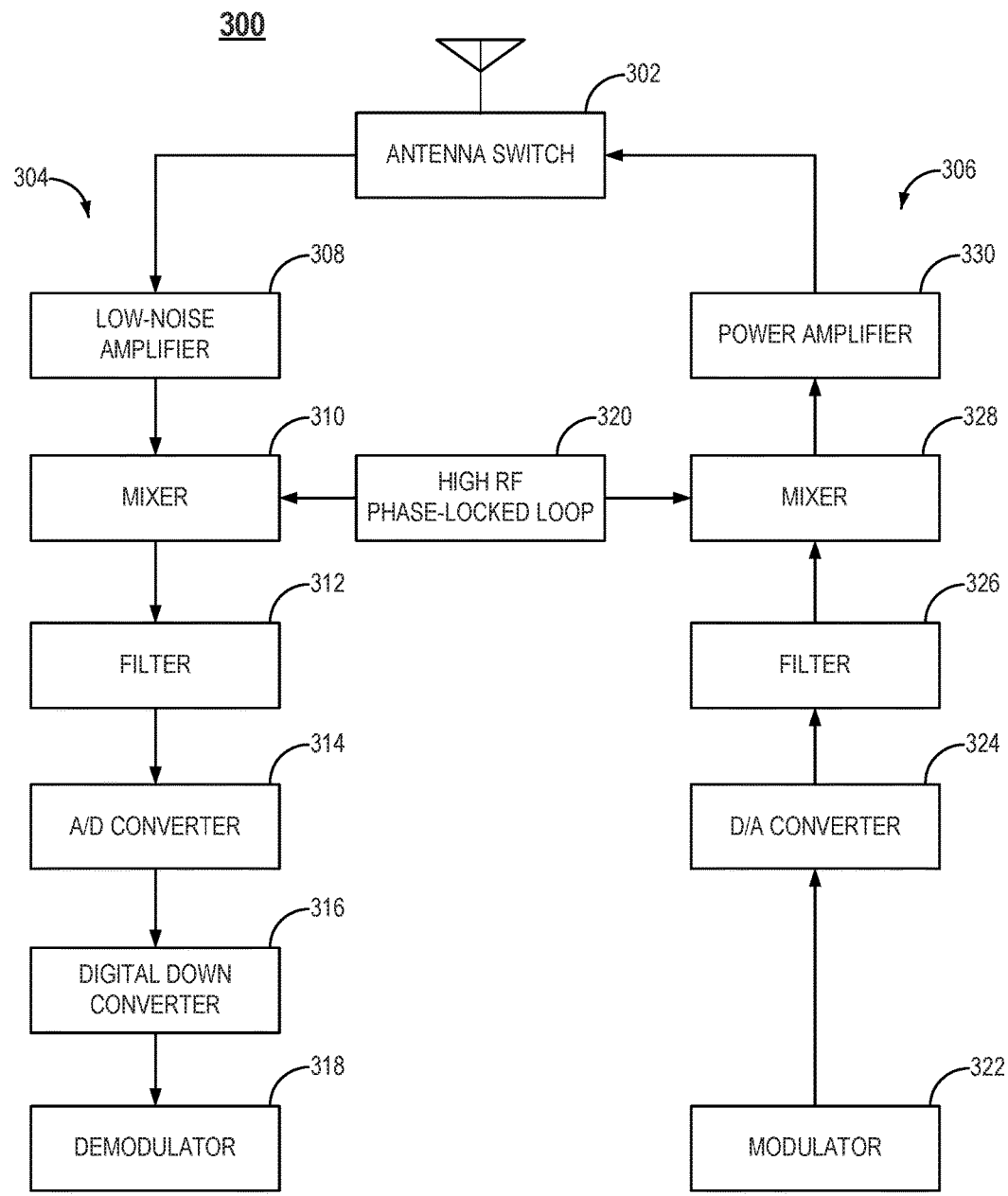
FIG. 3 is a block diagram illustrating an exemplary high RF module, in accordance with an embodiment.

FIG. 3 is a block diagram illustrating an exemplary high RF module 300 in accordance with an embodiment. High RF module 300 may be an example of high RF module 210 and high RF module 224 shown in FIG. 2. In this example, high RF module 300 may include an antenna switch 302, a receiver signal link 304, and a transmitter signal link 306. Antenna switch 302 may be configured to switch the antenna to work with receiver signal link 304 or transmitter signal link 306. Receiver signal link 304 may include a low-noise amplifier 308, a mixer 310, a filter 312, an analog-to-digital (A/D) converter 314, a digital down converter 316, and a demodulator 318. Transmitter signal link 306 may include a modulator 322, a digital-to-analog (D/A) converter 324, a filter 326, a mixer 328, and a power amplifier 330.

In some embodiments, in receiver signal link 304, the received RF signal (e.g., the audio information modulated by the carrier wave from the audio source) may be amplified by low-noise amplifier 308 to suppress the noise signal and increase SNR. The frequency of the amplified RF signal may be adjusted by mixer 310 and filtered by filter 312. The analog RF signal may be converted to a digital signal by A/D converter 314, and the intermediate frequency (IF) of the digital signal may be reduced by digital down converter 316. The audio information in the digital signal may be demodulated by demodulator 318. For example, the audio information provided by an audio source may be modulated by a carrier wave at 2.4 GHz and received and recovered in the digital format by receiver signal link 304. The demodulated digital audio information may be further processed to separate the audio information in different audio channels, e.g., left-channel and right-channel audio information.

In some embodiments, in transmitter signal link 306, digital audio information may be modulated by a carrier wave at a frequency (e.g., 2.4 GHz) by modulator 322 and converted into an analog signal by D/A converted 324. The analog signal may pass through filter 326 and mixer 328 to adjust its frequency. In some embodiments, a high RF phase-locked loop (PLL) 320 may be provided between mixer 310 in receiver signal link 304 and mixer 328 in transmitter signal link 306. High RF PLL 320 may detect the phase offset of mixers 310 and 328 and adjust the frequency of the output signal of transmitter signal link 306. For example, high RF PLL 320 may work at 2.4 GHz. The output signal may be amplified by power amplifier 330 before it is transmitted by the antenna. In some embodiments (e.g., high RF module 224 of secondary headphone 106 in FIG. 2), because the high RF module of a secondary headphone receives a high RF signal from a primary headphone, but does not transmit a high RF signal, transmitter signal link 306 of high RF module 300 may be disabled in operation when it is used in the secondary headphone.

Figure 4:
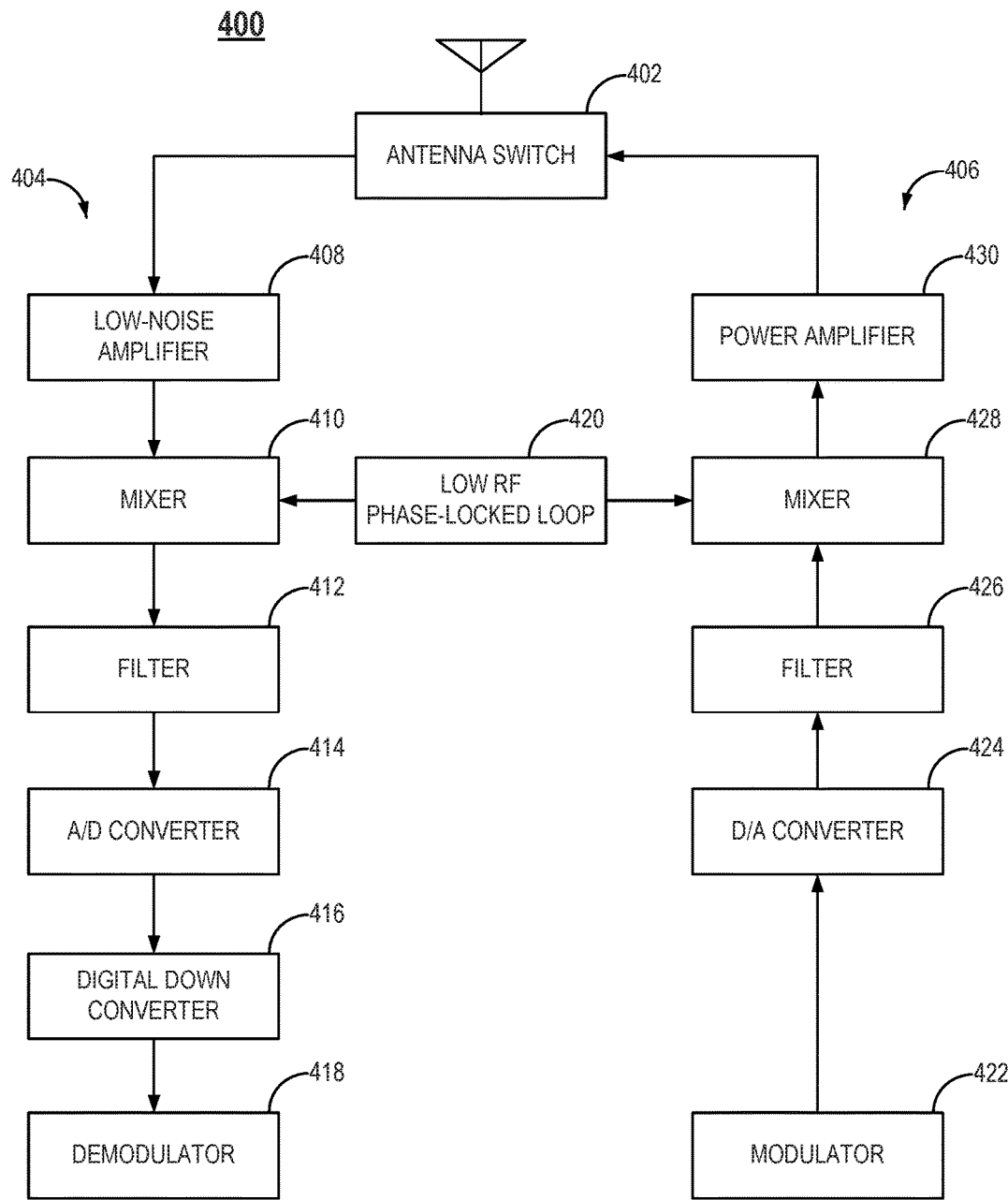
FIG. 4 is a block diagram illustrating an exemplary low RF module, in accordance with an embodiment.

FIG. 4 is a block diagram illustrating an exemplary low RF module 400 in accordance with an embodiment. Low RF module 400 may be an example of low RF module 212 and low RF module 226 shown in FIG. 2. In this example, low RF module 400 may include an antenna switch 402, a receiver signal link 404, and a transmitter signal link 406. Antenna switch 402 may be configured to switch the antenna to work with receiver signal link 404 or transmitter signal link 406. Receiver signal link 404 may include a low-noise amplifier 408, a mixer 410, a filter 412, an A/D converter 414, a digital down converter 416, and a demodulator 418. Transmitter signal link 406 may include a modulator 422, a D/A converter 424, a filter 426, a mixer 428, and a power amplifier 430.

In some embodiments, in receiver signal link 404, the received RF signal (e.g., the audio information modulated by the carrier wave from the primary headphone) may be amplified by low-noise amplifier 408 to suppress the noise signal and increase SNR. The frequency of the amplified RF signal may be adjusted by mixer 410 and filtered by filter 412. The analog RF signal may be converted to a digital signal by A/D converter 414, and the IF of the digital signal may be reduced by digital down converter 416. The audio information in the digital signal may be demodulated by demodulator 418. For example, the audio information provided from the primary headphone may be modulated by a carrier wave at 10 MHz and received and recovered in the digital format by receiver signal link 404. The demodulated digital audio information may include audio information in one of multiple audio channels, e.g., left-channel or right-channel audio information.

In some embodiments, in transmitter signal link 406, digital audio information may be modulated by a carrier wave at a frequency (e.g., 10 MHz) by modulator 422 and converted into an analog signal by D/A converted 424. The analog signal may pass through filter 426 and mixer 428 to adjust its frequency. In some embodiments, a low RF PLL may be provided between mixer 410 in receiver signal link 404 and mixer 428 in transmitter signal link 406. Low RF PLL 420 may detect the phase offset of mixers 410 and 428 and adjust the frequency of the output signal of transmitter signal link 406. For example, low RF PLL 420 may work at 10 MHz. The output signal may be amplified by power amplifier 430 before it is transmitted by the antenna. In some embodiments (e.g., low RF module 212 of primary headphone 104 in FIG. 2), because the low RF module of a primary headphone transmits a low RF signal to a secondary headphone, but does not receive a low RF signal, receiver signal link 404 of low RF module 400 may be disabled in operation when it is used in the primary headphone. In some embodiments (e.g., low RF module 226 of secondary headphone 106 in FIG. 2), because the low RF module of a secondary headphone receives a low RF signal from a primary headphone, but does not transmit a low RF signal, transmitter signal link 406 of low RF module 400 may be disabled in operation when it is used in the secondary headphone.

Figure 5:
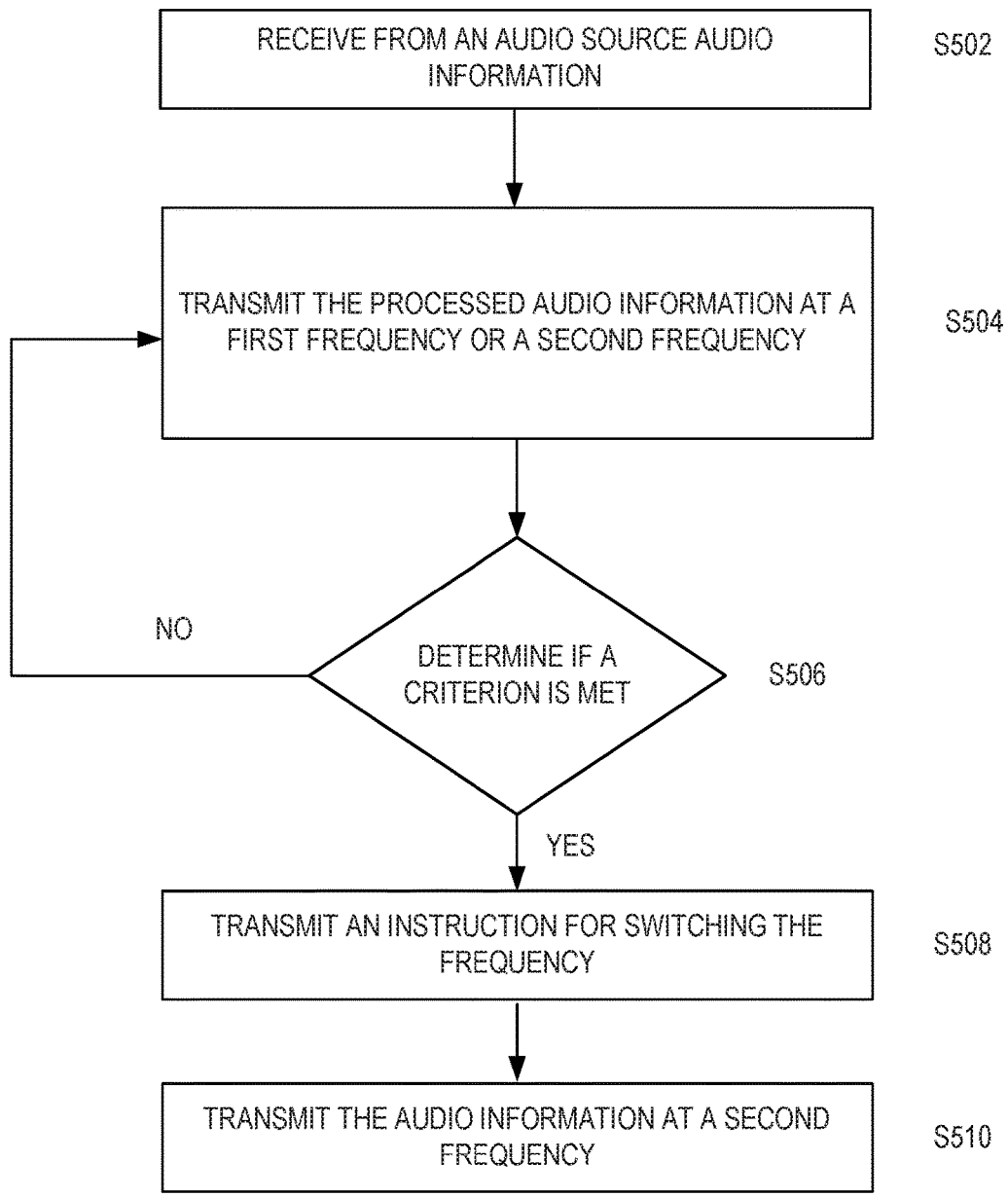
FIG. 5 is a flow chart illustrating an exemplary method for wirelessly communicating audio information in accordance with an embodiment.

FIG. 5 is a flow chart illustrating an exemplary method 500 for wirelessly communicating audio information in accordance with an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 5, as will be understood by a person of ordinary skill in the art.

Method 500 shall be described with reference to FIGS. 1 and 2. However, method 500 is not limited to that exemplary embodiment. Starting at 502, audio information is received using a first short-range wireless communication protocol, such as the Bluetooth protocol. In some embodiments, high RF module 210 of primary headphone 104 may receive a stream of mono or stereo audio information from high RF module 204 of audio source 102 at a high RF, such as 2.4 GHz, using the Bluetooth protocol.

At 504, audio information is processed by primary headphone 104. The processed audio information may be in one of the multiple audio channels of stereo audio and is transmitted at a first frequency or a second frequency lower than the first frequency using a second short-range wireless communication protocol amended from the first short-range wireless communication protocol, such as the amended Bluetooth protocol. The first frequency may be 2.4 GHz. The second frequency may be between 5 MHz and 50 MHz, such as 10 MHz. In some other embodiments, high RF module 210 of primary headphone 104 may transmit the processed audio information to low RF module 224 of secondary headphone 106 at a high RF, such as 2.4 GHz, using the Bluetooth protocol. In some other embodiments, low RF module 212 of primary headphone 104 may transmit the processed audio information to low RF module 226 of secondary headphone 106 at a low RF, such as 10 MHz, using the amended Bluetooth protocol.

At 506, a whether a criterion is met is determined. The criterion may be determining whether one or more parameters associated with the signal quality (e.g., PLRs, CRC, HEC and or FEC) passes predetermined thresholds. If the criterion is met, for example, one or more of the parameters indicates that the signal quality is low, method 500 moves to 508 where control module 220 and/or control module 232 may transmit an instruction for switching the transmission frequency. If the criterion is not met, for example, one or more of the parameters indicates that the signal quality is still good, method 500 moves back to 504 where primary headphone 104 keeps transmitting signals to secondary headphone 106 based on the ongoing frequency (as it was being transmitted). In some embodiments, control module 220 of primary headphone 104 and/or control module 232 of secondary headphone 106 may determine the signal quality of audio information received by primary headphone 104 as an indicator of whether to switch the working mode of primary headphone 104 or secondary headphone 106.

At 508, an instruction for switching the frequency is transmitted. The instruction can be transmitted based on a Bluetooth protocol, a Bluetooth Low Energy protocol or any suitable protocols. In some embodiments, the instruction can be an 8-bit signal that includes a switch request. In some embodiments, the instruction may be transmitted between physical layer module 214 of primary headphone 104 and physical layer 228 of secondary headphone 106.

At 510, after receiving the instruction for switching, primary headphone 104 may transmit the processed audio information at a different frequency than the ongoing frequency. For example, the instruction may be for switching the transmission frequency from basing on the second frequency to basing on the first frequency. Upon receiving the instruction, primary headphone 104 will switch the transmission frequency from the second frequency to the first frequency.

Figure 6A:
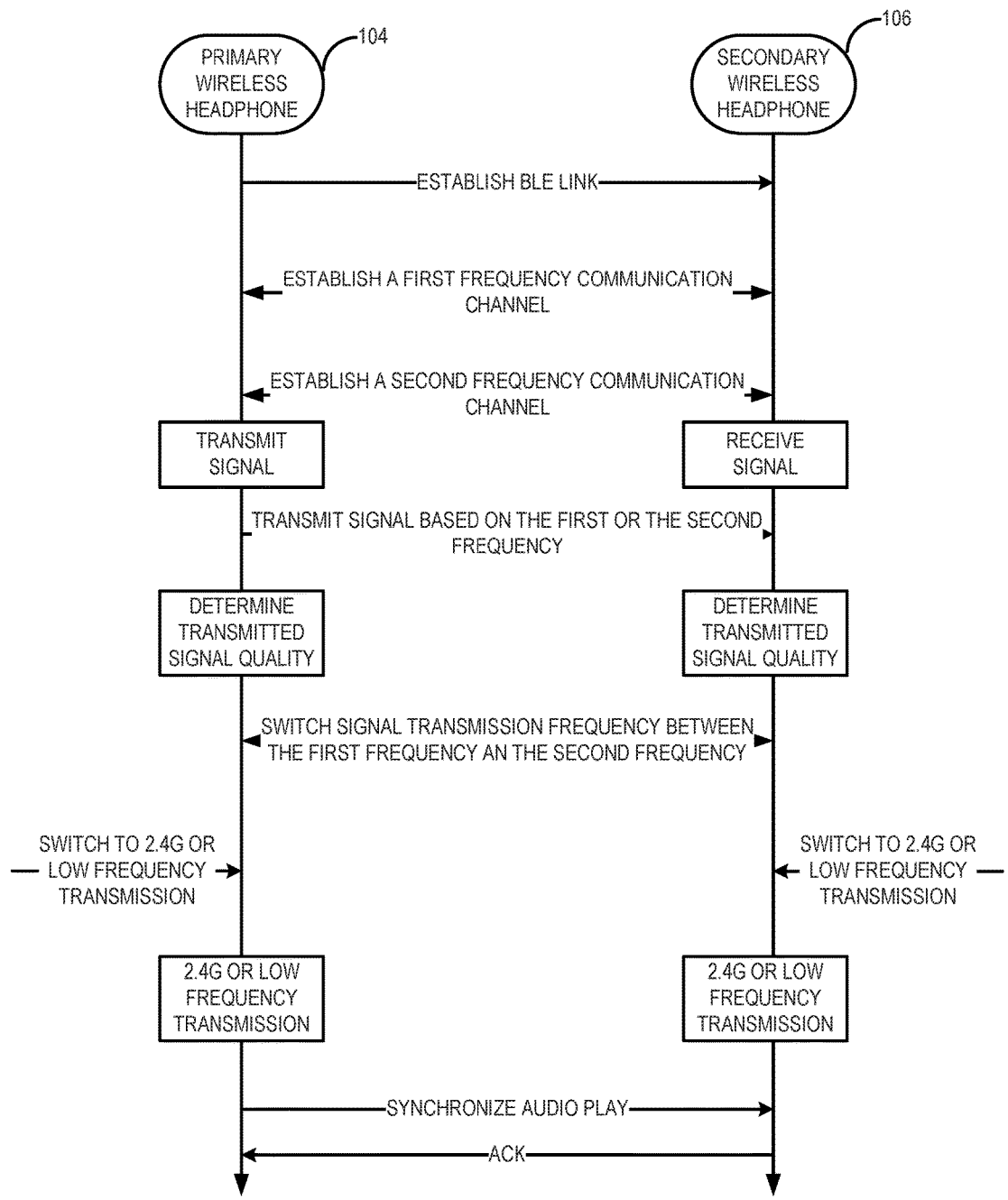
FIGS. 6A and 6B are timing diagrams illustrating operation mode switch of wireless headphones in accordance with various embodiments.
Figure 6B:
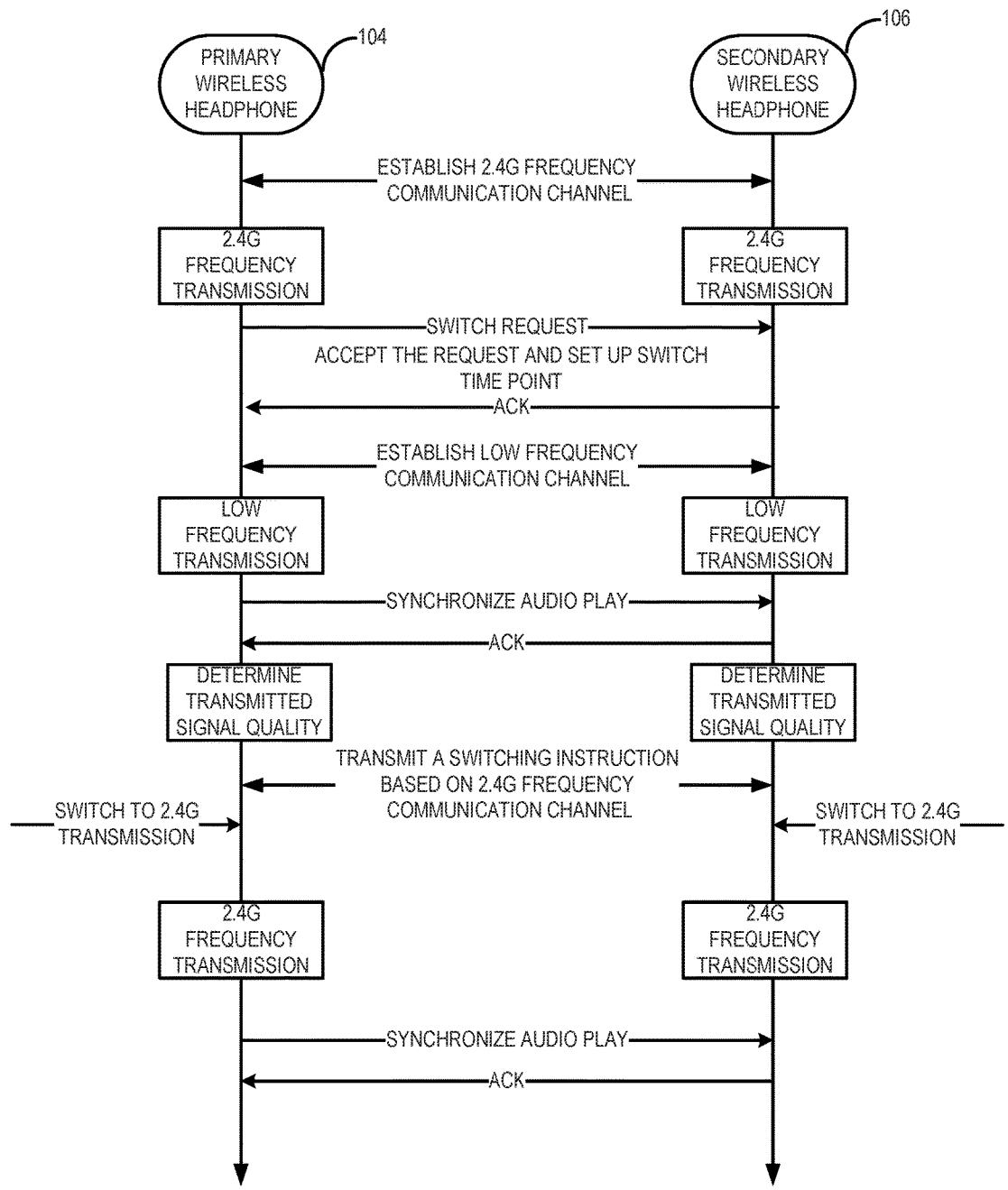

For example, FIGS. 6A and 6B are timing diagrams illustrating operation mode switch of wireless headphones in accordance with various embodiments.

In FIG. 6A, a Bluetooth Low Energy (BLE) link is first established between primary wireless headphone 104 and secondary wireless headphone 106. The BLE link is used for transmitting instructions. Then a first frequency communication channel and a second frequency communication channel are established. For example, the first frequency communication channel can be a channel where the signal can be transmitted at 2.4G frequency between primary headphone 104 and secondary headphone 106, and the second frequency communication channel can be another channel where the signal can be transmitted at 5-50 MHz frequency between primary headphone 104 and secondary headphone 106. Then the signal is transmitted from primary headphone 104 to secondary headphone 106 based on either the first frequency, for example using the first frequency communication channel to transmit the signal, or based on the second frequency, for example using the second frequency communication channel to transmit the signal. Wireless audio system 100 may then determine the quality of the transmitted signal. For example, wireless audio system 100 may determine at least one of the Packet Loss Ratios (PLRs), Cyclic Redundancy Check (CRC), Header Error Check sum (HEC) and/or Frame Error Check sum (FEC) of the transmitted signal and/or any other suitable parameters of the transmitted signal. Wireless audio system 100 may switch signal transmission frequency if one or all of the criteria is not met. For example, wireless audio system 100 may switch the transmission frequency from the current frequency to the other frequency if one of the parameters associated with the transmitted signal is lower than a threshold. Based on the switch of the frequency, wireless audio system 100 may then synchronize audio play between primary headphone 104 and secondary headphone 106 and send an acknowledgment message (ACK) from secondary headphone 106 to primary headphone 104 based on the new channel.

In FIG. 6B, where 2.4G frequency communication channel is first established and the signal is transmitted between primary headphone 104 and secondary headphone 106 based on the 2.4G frequency transmission. Primary headphone 104 may send a request to secondary headphone 106 regarding switching transmission frequency at a certain time point (e.g., after 10$s$). Secondary headphone 106 may accept the request, set up the switching time point and send an acknowledgment message (ACK) from secondary headphone 106 to primary headphone 104. Wireless audio system 100 may then establish a low frequency communication channel and start transmitting the signal based on the low frequency. Secondary headphone 106 may send an ACK to primary headphone 104 and wireless audio system 100 may synchronize audio play between primary headphone 104 and secondary headphone 106. While transmitting the signal based on the low frequency, wireless audio system 100 may determine the quality of the transmitted signal. For example, wireless audio system 100 may determine at least one of the Packet Loss Ratios (PLRs), Cyclic Redundancy Check sum (CRC), Header Error Check sum (HEC) and/or Frame Error Check sum (FEC) of the transmitted signal and/or any other suitable parameters of the transmitted signal. Wireless audio system 100 may switch signal transmission frequency if one or all of the criteria is not met. For example, wireless audio system 100 may switch the transmission frequency from the low frequency to 2.4G if one of the parameters associated with the transmitted signal is lower than a threshold. Wireless audio system 100 may then transmit the signal based on 2.4G frequency. Secondary headphone 106 may send an ACK to primary headphone 104 and wireless audio system 100 may synchronize audio play between primary headphone 104 and secondary headphone 106.

Figure 7:
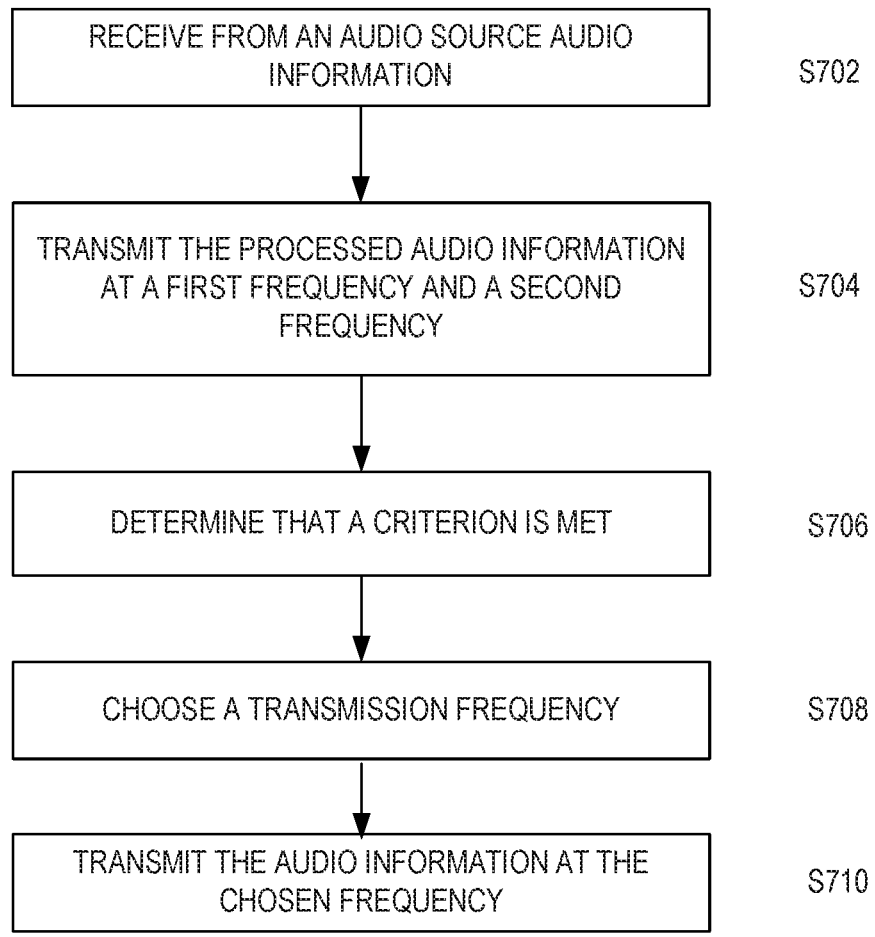
FIG. 7 is a flow chart illustrating another exemplary method for wirelessly communicating audio information in accordance with an embodiment.

FIG. 7 is a flow chart illustrating another exemplary method 700 for wirelessly communicating audio information in accordance with an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 6, as will be understood by a person of ordinary skill in the art.

Method 700 shall be described with reference to FIGS. 1 and 2. However, method 700 is not limited to that exemplary embodiment. Starting at 702, audio information is received using a first short-range wireless communication protocol, such as the Bluetooth protocol. In some embodiments, high RF module 210 of primary headphone 104 may receive a stream of mono or stereo audio information from high RF module 204 of audio source 102 at a high RF, such as 2.4 GHz, using the Bluetooth protocol.

At 704, audio information is processed by primary headphone 104. The processed audio information may be in one of the multiple audio channels of stereo audio and is transmitted at both a first frequency and a second frequency lower than the first frequency using a second short-range wireless communication protocol amended from the first short-range wireless communication protocol, such as the amended Bluetooth protocol. The processed audio information may be transmitted between physical layer module 214 of primary headphone 104 and physical layer 228 of secondary headphone. The first frequency may be 2.4 GHz. The second frequency may be between 5 MHz and 50 MHz, such as 10 MHz. In some other embodiments, high RF module 210 of primary headphone 104 may transmit the processed audio information to high RF module 224 of secondary headphone 106 at a high RF, such as 2.4 GHz, and low RF module 212 of primary headphone 104 may transmit audio information to low RF module 226 of secondary headphone 106 at a low RF, such as 10 MHz, simultaneously. Both high RF and low RF are transmitted through physical layer 214 and physical layer 228.

At 706, whether a criterion is met is determined. The criterion may be determining whether CRC associated with the processed audio information transmitted based on both the first frequency and the second frequency pass the predetermined threshold.

At 708, control module 220 and/or control module 232 may choose one of the first or the second frequency for Bluetooth link and Bluetooth low energy link module 216 to transmit the processed audio information. For example, if the CRC of both transmitted information (audio information transmitted based on high RF and transmitted based on low RF) meet the requirement (e.g., reminder of the check is 0) and may choose one frequency for Bluetooth link and Bluetooth low energy link module 216 to transmit audio information. For example, if the check is succeeded (e.g., the reminder of CRC is 0) the transmitted audio information meets the requirement. Otherwise, the transmitted audio information fails to meet the requirement. In some embodiments, if both of the transmitted audio information meet the requirement (e.g., reminder of the check is 0) or if both of the transmitted audio information fail to meet the requirement (e.g., reminder of the check is not 0), control module may choose either the first frequency or the second frequency for MAC layer to transmit the audio information. However, if only one meets the requirement and the other does not, control module 220 and/or control module 232 may choose the one that meets the requirement for MAC layer to transmit the audio information.

At 710, primary headphone 104 may transmit the processed audio information based on the chosen frequency. For example, high frequency RF module 210 of primary headphone 104 will transmit the processed audio information to high frequency RF module 224 of secondary headphone 106 through the communication between Bluetooth link and Bluetooth low energy link module 216 and Bluetooth link and Bluetooth low energy link module 230 if control module 220 and/or control module 232 choose to transmit the processed audio information based on the first frequency.

Figure 8:
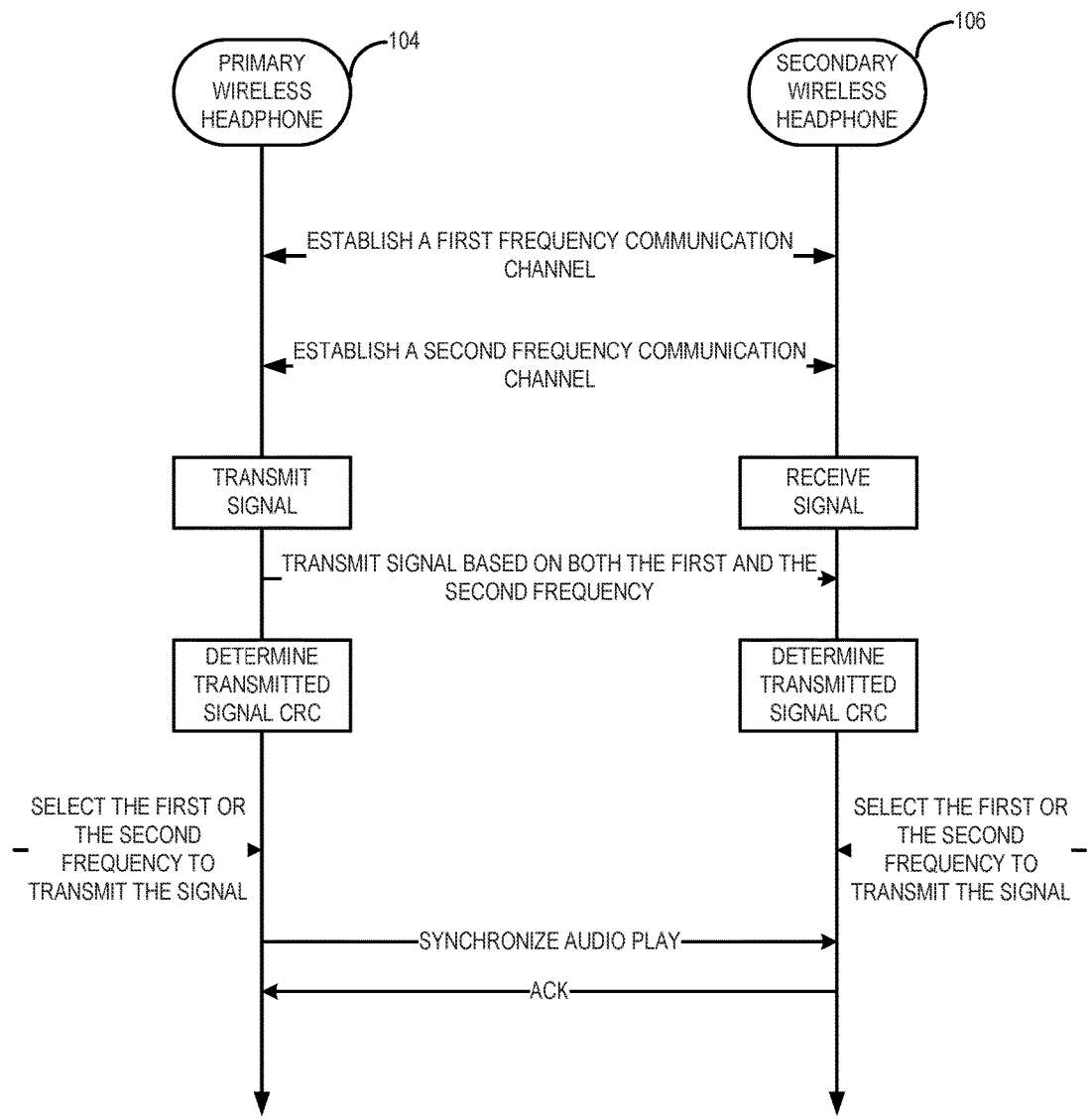
FIG. 8 is a timing diagram illustrating another operation mode switch of wireless headphones in accordance with various embodiments.

FIG. 8 is a timing diagram illustrating another operation mode switch of wireless headphones in accordance with various embodiments. In FIG. 8, both first frequency communication channel and a second frequency communication channel are established. For example, the first frequency communication channel can be a channel where the signal can be transmitted at 2.4G frequency between primary headphone 104 and secondary headphone 106, and the second frequency communication channel can be another channel where the signal can be transmitted at 5-50 MHz between primary headphone 104 and secondary headphone 106. Then the signal is transmitted from primary headphone 104 to secondary headphone 106 based on both the first frequency for example using the first frequency communication channel to transmit the signal and based on the second frequency for example using the second frequency communication channel to transmit the signal. Wireless audio system 100 may then determine the quality of the transmitted signal. For example, wireless audio system 100 may determine at least one of the Packet Loss Ratios (PLRs), Cyclic Redundancy Check (CRC), Header Error Check sum (HEC) and/or Frame Error Check sum (FEC) of the transmitted signal and/or any suitable parameters of the transmitted signal. Wireless audio system 100 may select signal transmission frequency if one or all of the criteria is met. For example, wireless audio system 100 may select either of the 2.4G or low frequency if both channels met the criteria. Wireless audio system 100 may select the channel which met the criteria if only one channel met the criteria. Wireless audio system 100 may select a better channel (e.g., the channel that is closer to meet the criteria) if none of the channels met the criteria. Based on the selection, wireless audio system 100 may then synchronize audio play between primary head phone 104 and secondary headphone 106 and send an acknowledgment message (ACK) from secondary headphone 106 to primary headphone 104 based on the new channel.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments but should be defined only in accordance with the following claims and their equivalents.

What is claimed is:

1. A wireless audio system comprising:
a primary wireless audio transceiver comprising:
   a first radio frequency module configured to transmit audio information at a first frequency; and
   a second radio frequency module configured to transmit the audio information at a second frequency; and
a secondary wireless audio transceiver comprising:
   a third radio frequency module configured to receive the audio information at the first frequency; and
   a fourth radio frequency module configured to receive the audio information at the second frequency;
wherein the first radio frequency module of the primary wireless audio transceiver transmits the audio information to the third radio frequency module of the secondary wireless audio transceiver, and the second radio frequency module of the primary wireless audio transceiver transmits the audio information to the fourth radio frequency module of the secondary wireless audio transceiver; and
at least one of the primary wireless transceiver and the secondary wireless transceiver comprises a control module configured to:
   determine that a criterion corresponding to switching a transmission frequency at which the audio information is transmitted from the primary wireless audio transceiver to the secondary wireless audio transceiver between the first frequency and the second frequency is met; and
   in response to the determination, switch the transmission frequency between the first frequency and the second frequency at a prearranged time slot based on a prearranged agreement.

2. The wireless audio system of claim 1, wherein the communication between the primary wireless transceiver and the secondary transceiver is based on a first short-range wireless communication protocol.

3. The wireless audio system of claim 2, wherein the first short-range wireless communication protocol comprises a Bluetooth protocol.

4. The wireless audio system of claim 1, wherein the first frequency is about 2.4 GHz.

5. The wireless audio system of claim 1, wherein to determine if the criterion is met, the control module is further configured to:
acquire a parameter corresponding to a quality of the transmitted audio information; and
determine the parameter is higher than a predetermined threshold.

6. The wireless audio system of claim 1, wherein the control module is further configured to transmit a control instruction comprising an initial Slot time value associated with switching the transmission frequency from the first frequency to the second frequency.

7. The wireless audio system of claim 5, wherein the parameter is an error-detecting code associated with the transmitted audio information.

8. The wireless audio system of claim 2, wherein the control model is further configured to transmit a control instruction corresponding to switching the transmission frequency based on a second short-range wireless communication protocol.

9. The wireless audio system of claim 8, wherein the second short-range wireless protocol is a Bluetooth Low Energy (BLE) protocol.

10. The wireless audio system of claim 1, wherein the second frequency is between about 5 MHz and about 50 MHz.

11. The wireless audio system of claim 10, wherein the second frequency is about 10 MHz.

12. The wireless audio system of claim 1, wherein the audio information is transmitted at a symbol rate higher than 1 Msymbol/s.

13. A method for wirelessly communicating audio information, comprising:
receiving, from an audio source, a first audio information;
generating a second audio information based on the first audio information;
transmitting, from a first radio frequency module of a wireless audio transceiver, the second audio information to a third radio frequency module of another wireless audio transceiver at a first frequency;
determining that a parameter associated with the transmission is higher than a predetermined threshold; and
in response to the determination, transmitting, from a second radio frequency module of the wireless audio transceiver, the second audio information to a fourth radio frequency module of the another wireless audio transceiver at a second frequency at an initial Slot time value associated with switching the transmission frequency from the first frequency to the second frequency.

14. The method of claim 13, wherein the first frequency is about 2.4 GHz.

15. The method of claim 13, wherein the second frequency is between about 5 MHz and about 50 MHz.

16. The method of claim 13, wherein the second frequency is about 10 MHz.

17. A method for wirelessly communicating audio information, comprising:
receiving, from an audio source, a first audio information;
generating a second audio information based on the first audio information;
transmitting, from a first radio frequency module of a wireless audio transceiver, the second audio information to a third radio frequency module of another wireless audio transceiver at a first frequency;
determining that a parameter associated with the transmission is higher than a predetermined threshold;
in response to the determination, transmitting a control instruction corresponding to switching the transmission frequency based on using a short-range wireless communication protocol; and
switching the frequency based on which the second audio information is transmitted from the first frequency to a second frequency at a prearranged time slot based on a prearranged agreement, wherein the second audio information is transmitted from a second radio frequency module of the wireless audio transceiver to a fourth radio frequency module of the another wireless audio transceiver.

18. The method of claim 17, wherein the short-range wireless protocol is a Bluetooth Low Energy (BLE) protocol.

19. The method of claim 17, wherein the parameter is an error-detecting code associated with the transmitted audio information.

20. A wireless audio system comprising:
a primary wireless audio transceiver comprising:
  a first radio frequency module configured to transmit audio information at a first frequency; and
  a second radio frequency module configured to transmit the audio information at a second frequency; and
a secondary wireless audio transceiver comprising:
  a third radio frequency module configured to receive the audio information at the first frequency; and
  a fourth radio frequency module configured to receive the audio information at the second frequency;
wherein at least one of the primary wireless transceiver and the secondary wireless transceiver comprises a control module configured to:
  determine that a criterion corresponding to switching a transmission frequency at which the audio information is transmitted from the primary wireless audio transceiver to the second wireless audio transceiver between the first frequency and the second frequency is met, wherein the criterion is based on a starting point of switching the transmission frequency; and
  in response to the determination, switch the transmission frequency.

21. A wireless audio system comprising:
a primary wireless audio transceiver comprising:
  a first radio frequency module configured to transmit audio information at a first frequency; and
  a second radio frequency module configured to transmit the audio information at a second frequency; and
a secondary wireless audio transceiver comprising:
  a third radio frequency module configured to receive the audio information at the first frequency; and
  a fourth radio frequency module configured to receive the audio information at the second frequency;
wherein at least one of the primary wireless transceiver and the secondary wireless transceiver comprises a control module configured to:
  determine that a criterion corresponding to switching a transmission frequency at which the audio information is transmitted from the primary wireless audio transceiver to the second wireless audio transceiver between the first frequency and the second frequency is met;
  transmit a control instruction comprising an initial Slot time value associated with switching the transmission frequency from the first frequency to the second frequency; and
in response to the determination, switch the transmission frequency.

* * * * *